Dec. 16, 1969  W. M. SCHWARTZ, JR., ET AL  3,483,814
BREAD TOASTER
Filed Aug. 23, 1966  8 Sheets-Sheet 4
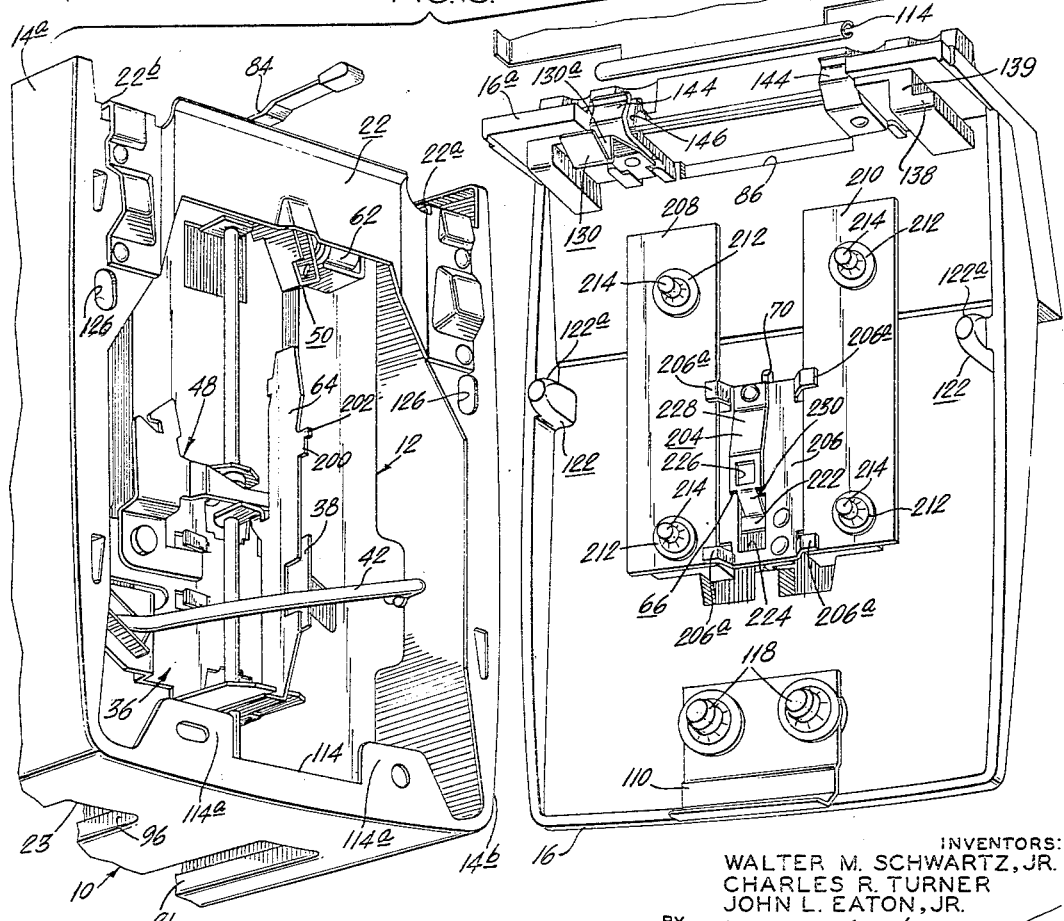
INVENTORS:
WALTER M. SCHWARTZ, JR.
CHARLES R. TURNER
JOHN L. EATON, JR.
BY *Howson & Howson*
ATTYS.

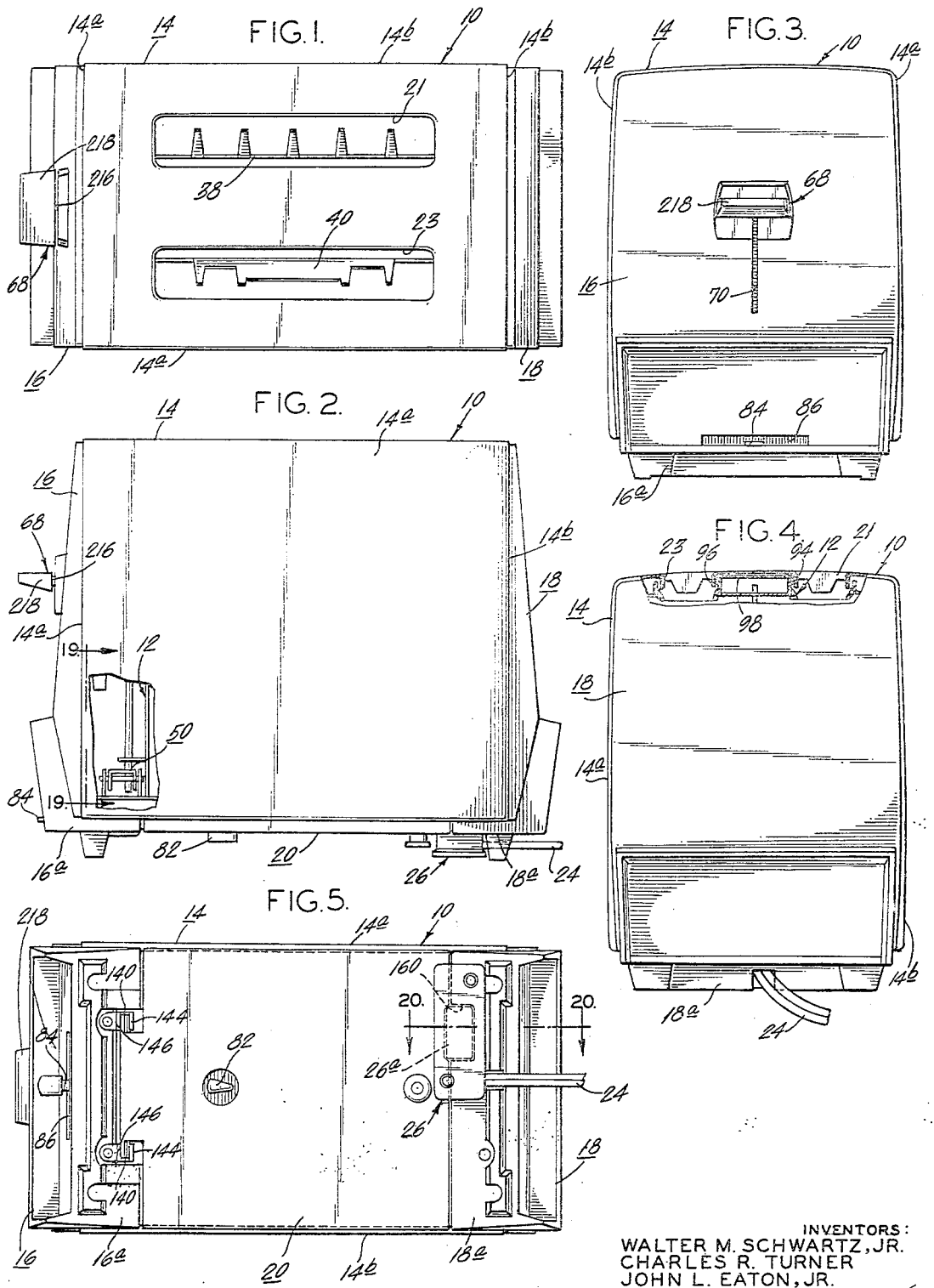

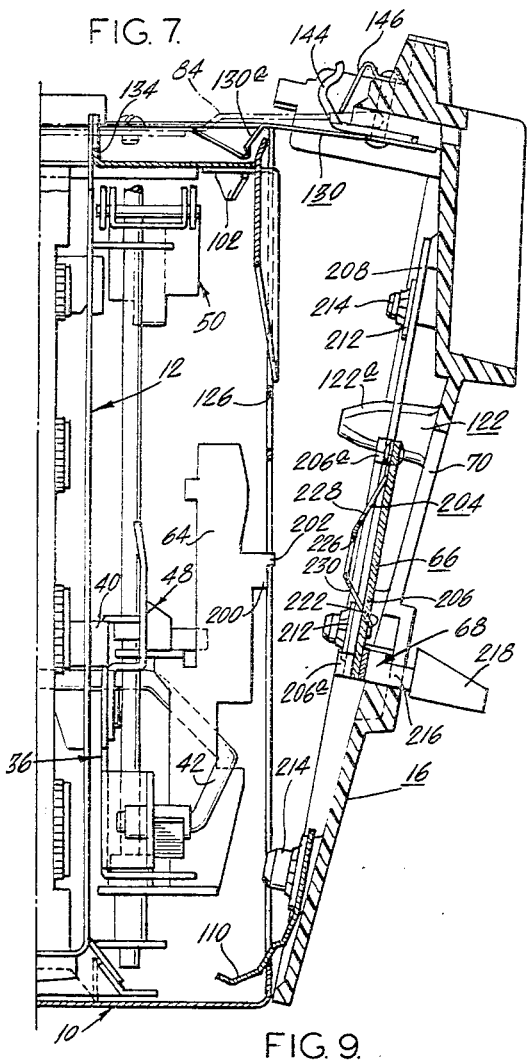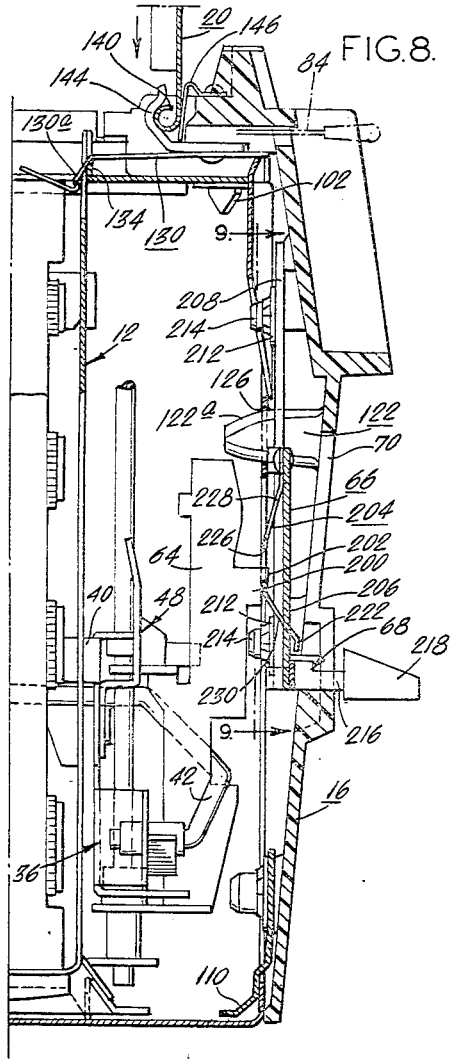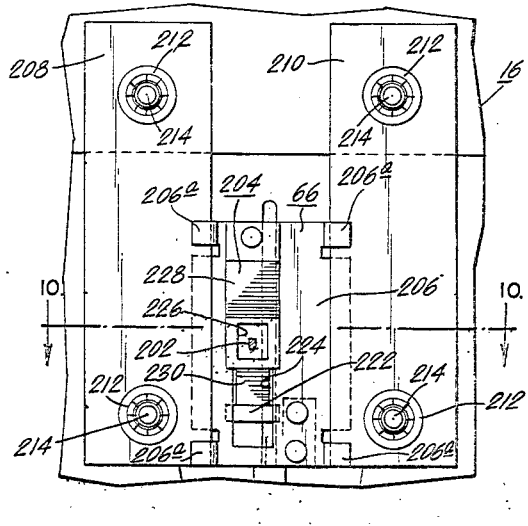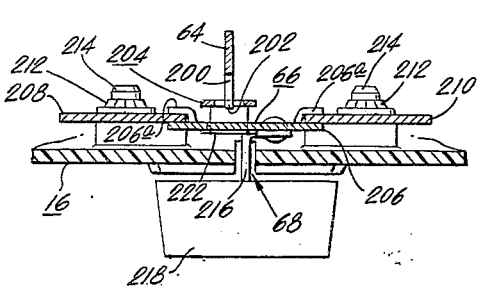
INVENTORS:
WALTER M. SCHWARTZ, JR.
CHARLES R. TURNER
JOHN L. EATON JR.
ATTYS.

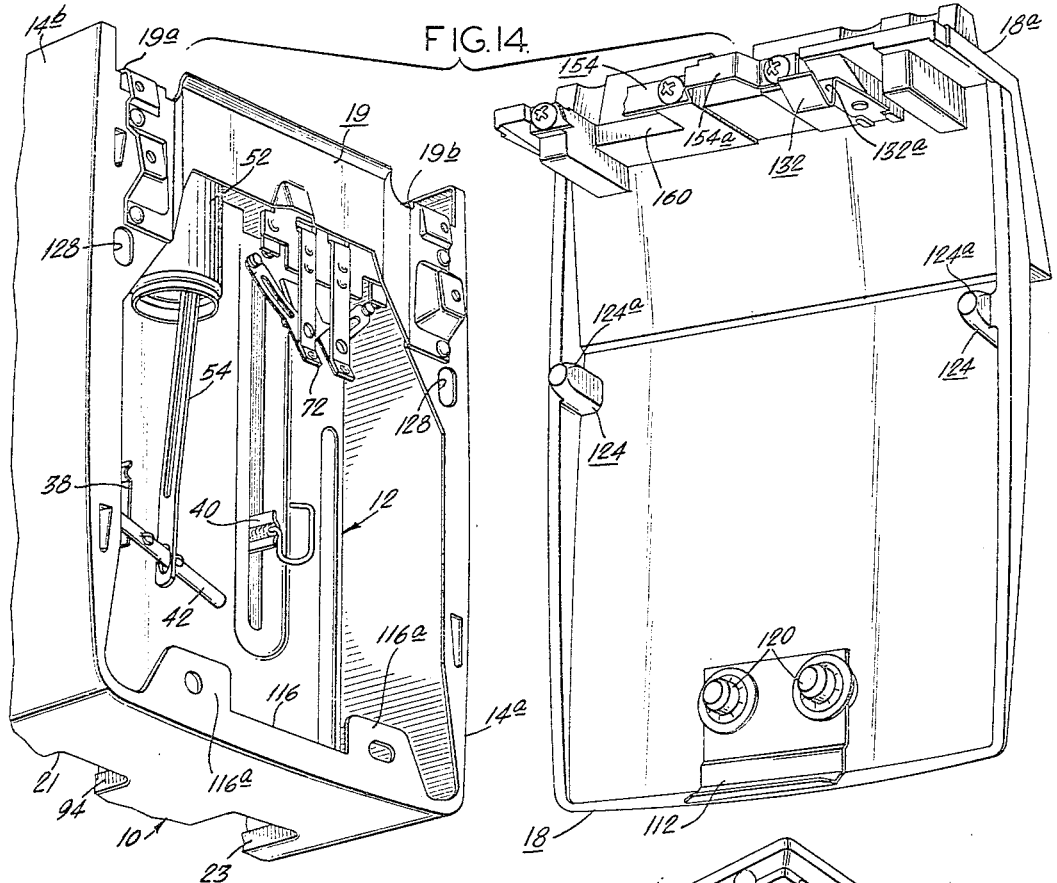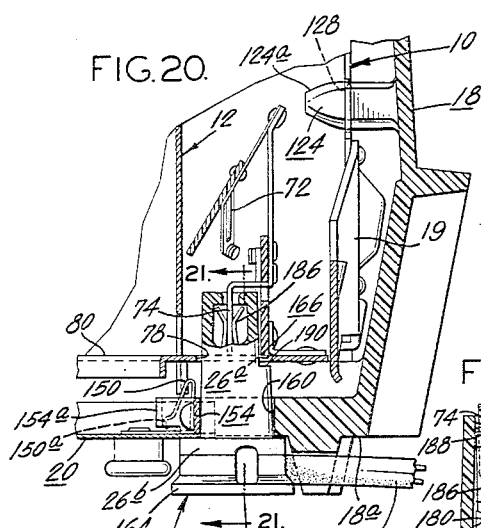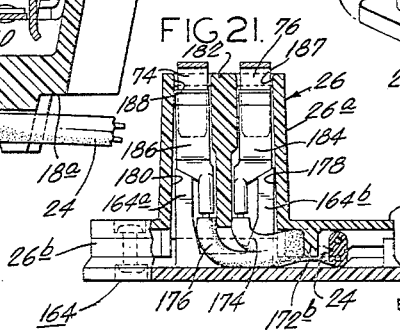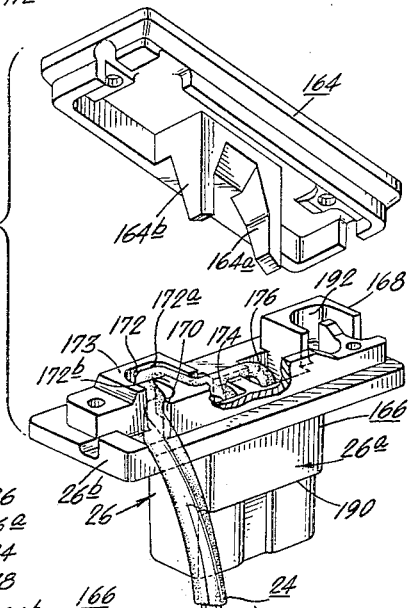
INVENTORS:
WALTER M. SCHWARTZ, JR.
CHARLES R. TURNER
JOHN L. EATON, JR.
BY Howson & Howson
ATTYS.

Dec. 16, 1969    W. M. SCHWARTZ, JR., ET AL    3,483,814
BREAD TOASTER
Filed Aug. 23, 1966    8 Sheets-Sheet 6
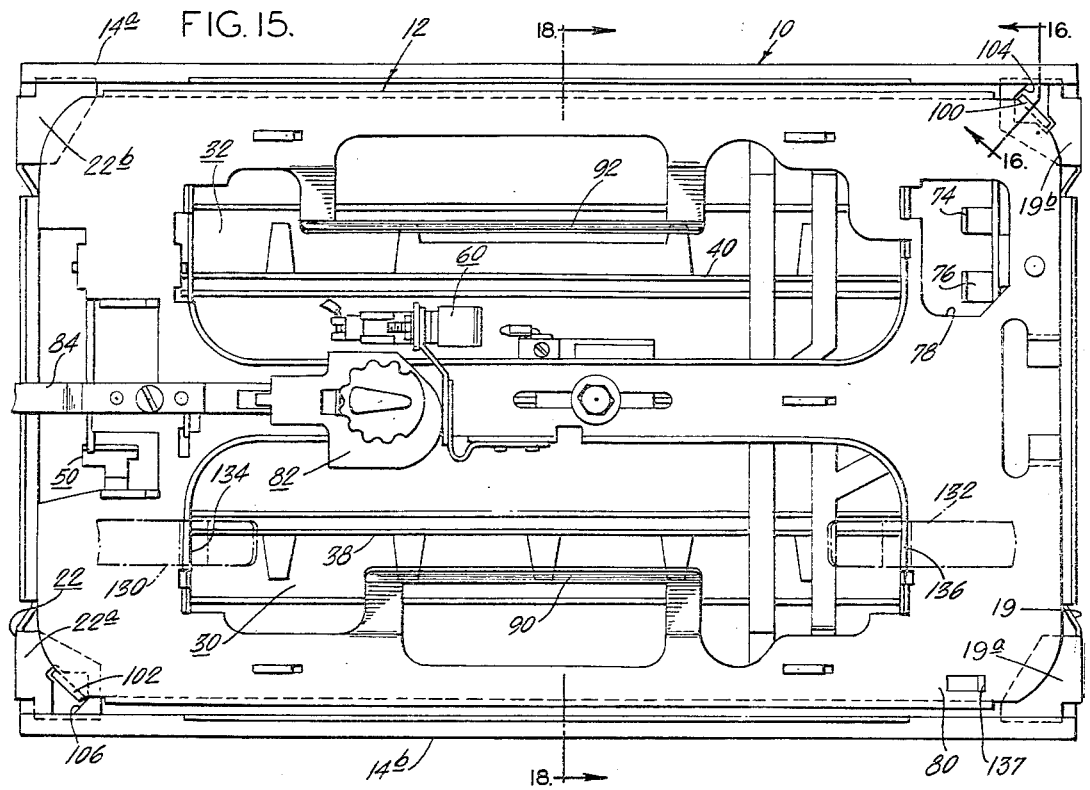
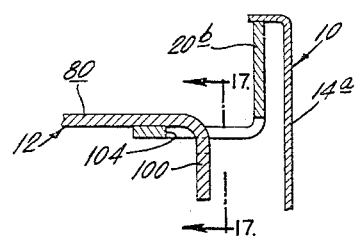
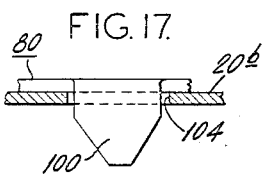
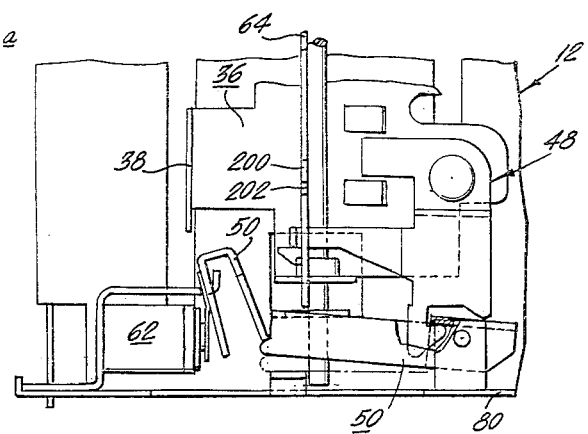
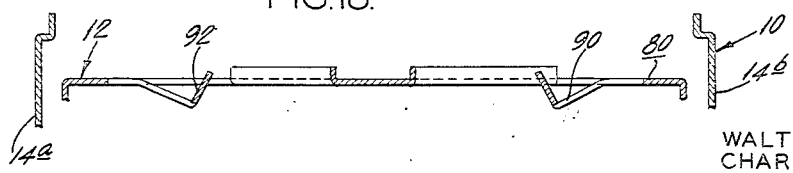
INVENTORS:
WALTER M. SCHWARTZ, JR.
CHARLES R. TURNER
JOHN L. EATON, JR.
BY Howson & Howson
ATTYS.

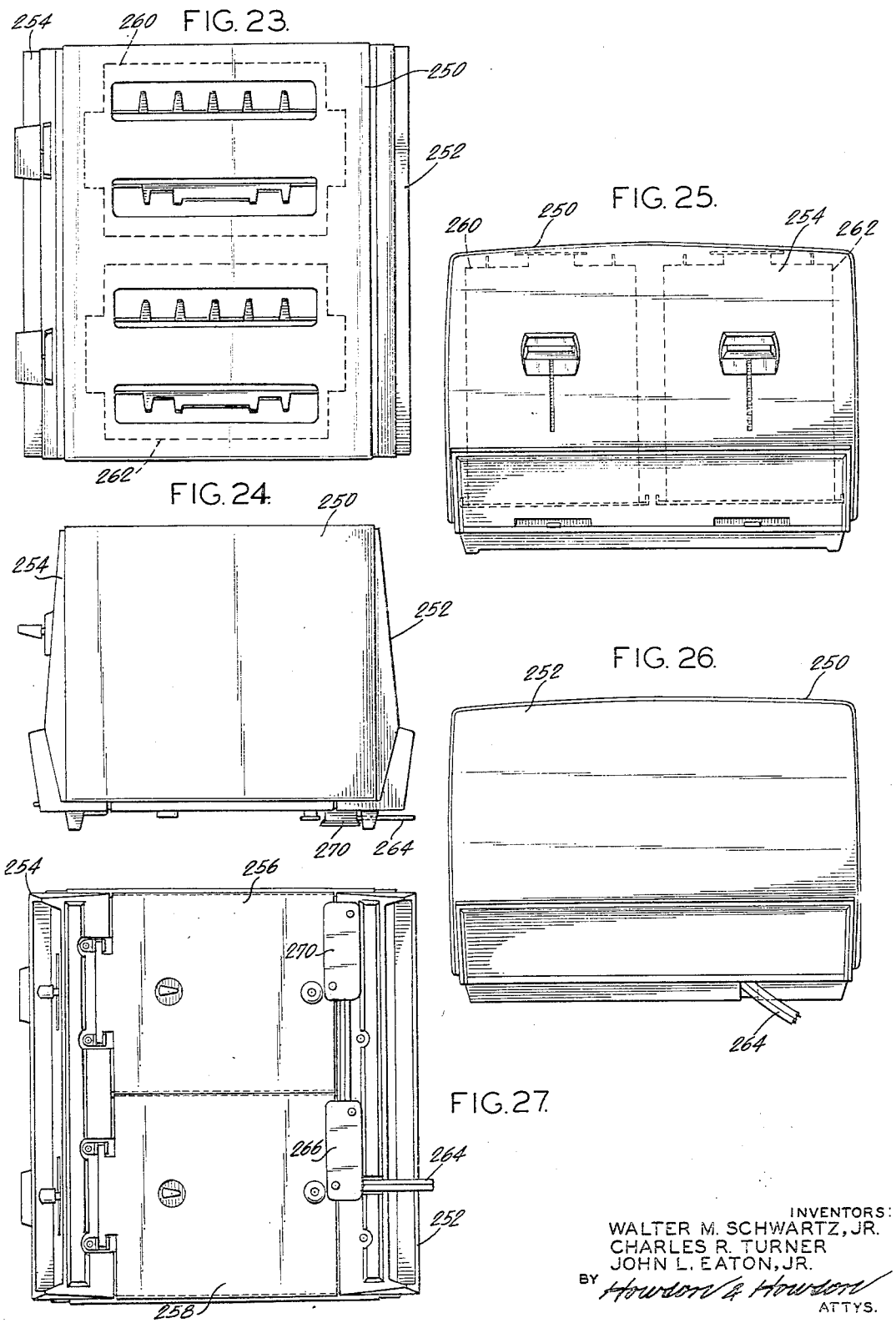

Dec. 16, 1969    W. M. SCHWARTZ, JR., ET AL    3,483,814
BREAD TOASTER

Filed Aug. 23, 1966                    8 Sheets-Sheet 8

INVENTORS:
WALTER M. SCHWARTZ, JR.
CHARLES R. TURNER
JOHN L. EATON, JR.
BY Howson & Howson
ATTYS.

United States Patent Office 3,483,814
Patented Dec. 16, 1969

3,483,814
BREAD TOASTER
Walter M. Schwartz, Jr., and Charles R. Turner, Philadelphia, and John L. Eaton, Jr., Levittown, Pa., assignors to Proctor-Silex Incorporated, Philadelphia, Pa., a corporation of New York
Filed Aug. 23, 1966, Ser. No. 574,359
Int. Cl. A47j 37/08
U.S. Cl. 99—391                                    62 Claims

ABSTRACT OF THE DISCLOSURE

A bread toaster is provided having a plurality of component parts including a chassis component having a bread oven with a bread supporting carriage engageable for movement between bread receiving and bread toasting positions, and a housing component adapted to receive the chassis therein, one of the components having manually releasable latch means for operatively coupling the chassis to the housing, whereby upon manual release of the latch means the chassis may be removed from the housing.

---

The present invention relates to a bread toaster, and more particularly, to a toaster having component parts which can be quickly and easily assembled and disassembled without the use of tools.

In the prior art many toasters have been designed having components which are capable of being assembled and disassembled for repair or replacement of parts. The components of these toasters have been held together by fastening means requiring tools to enable the toaster to be disassembled into its component parts in servicing the appliance when defective. For the most part, when the appliance becomes defective, the components have not been arranged and designed such that an unskilled user can repair or replace the defective part. The repair of the defective appliance usually requires that the appliance be taken to an experienced repairman and in most instances it is difficult to obtain fast, economical and effective service. The cost of labor in repairing defective toasters tends to be very high so that even when the needed part is available, the service charge for minor repair frequently approaches the replacement price of the entire toaster.

Accordingly, it is an objective of the present invention to provide a toaster which can be maintained in good operating condition by a person having no special knowledge, skill, training or experience in repair of electrical appliances, such as a housewife. In order to accomplish this objective it is desirable to provide a toaster having components coupled together by fastening means not requiring tools to disassemble the elements. Furthermore, it is desirable to provide a toaster with a limited number of components designed to maintain accurate alignment while being assembled and which provide a rugged construction when fastened together in the toaster assembly. It is also desirable to provide means for protecting the person disassembling the toaster from electrical shock when the electrical cord of the toaster is connected to a source of power.

In accordance with the present invention, a toaster is provided comprising a plurality of component parts including the chassis component and a component serving as at least a portion of the housing for the chassis having manually releasable fastening means for coupling the components together in an operative form. Preferably the fastening means comprises manually releasable latch means fixed to one of the components. In one form of the invention, the chassis component has at least one bread oven with a bread supporting carriage for movement between a bread receiving and a bread toasting position, and having heating means on opposite sides of the oven. The housing is adapted to receive the chassis therein and has an opening cooperable with the bread oven in the chassis. Manually releasable fastening means is employed for operative coupling the chassis to the housing so that upon manual release of the fastening means the chassis may be removed from the housing for easy replacement of the same or a new chassis.

The number of component parts employed in the toaster and their interconnection into an operative structure may vary greatly in accordance with the invention. The toaster preferably comprises as component parts a chassis, a hollow housing having at least one end opening and a bottom opening, at least one end cover for closing the at least one end opening, and a closure for the bottom opening serving as a crumb tray beneath the housing. According to the present invention, there is preferably provided manually releasable fastening means for selectively interconnecting the component parts, alignment members and mating positioning means on cooperating parts serving to guide the parts into a desired position, and manually releasable latch means associated with the end cover for engaging the bread supporting carriage for moving the carriage between bread receiving and bread toasting positions. Also preferably employed is a connector for connecting the electrical cord to the toaster, which must be disconnected from the connector before the toaster can be disassembled.

With the selection of a number of component parts for the toaster and coupling the parts together by manually releasable fastening means, the toaster can be maintained in good operating condition by a person having no special skill or experience in repair by simple disassembly of the toaster and replacement of a defective component. A defective or broken component part can be easily and quickly removed from the toaster without the use of special tools for disassembly and reassembly thereby avoiding costly repair and labor expenses. It should be appreciated that the toaster in accordance with the present invention can provide a lifelong appliance only requiring easy replacement of broken or defective component parts by unskilled persons.

For a better understanding of these and other features and advantages of the present invention, reference is made to the following drawings, in which:

FIG. 1 is a plan view of a toaster embodying the present invention;

FIG. 2 is a side elevational view of the toaster of FIG. 1 and showing the housing partially broken away;

FIG. 3 is an elevational view of the left end of the toaster of FIG. 2;

FIG. 4 is an elevational view of the right end of the toaster of FIG. 2 and showing parts broken away;

FIG. 5 is an inverted plan view of the toaster;

FIG. 7 is an enlarged fragmentary sectional elevation, inverted similar to FIG. 6, illustrating the assembly of one end cover with the assembled chassis and outer shell;

FIG. 8 is an inverted sectional view similar to FIG. 7 showing the end cover in assembled position with the crumb tray being coupled to the end cover;

FIG. 9 is a fragmentary sectional view taken along the line 9—9 of FIG. 8;

FIG. 10 is a sectional view taken along the line 10—10 of FIG. 9;

FIG. 11 is a sectional view similar to FIG. 8 but with the toaster placed right side up and showing the coaction between the latch means of the lifter mechanism and the bread support carriage after assembly is complete;

FIG. 12 is a sectional view similar to FIG. 11 and showing the latch means of lifter mechanism in preferred operative engagement for conditioning the toaster for normal operation;

FIG. 13 is a composite inverted perspective view of the toaster and showing the left end cover with the lifter mechanism before assembly on the left end of the housing;

FIG. 14 is a composite inverted perspective view of the toaster and showing the right end cover before assembly on the right end of the housing;

FIG. 15 is an inverted plan view of the toaster with the end panels and crumb tray removed;

FIG. 16 is an enlarged fragmentary sectional view taken along the line 16—16 of FIG. 15;

FIG. 17 is a sectional view taken along line 17—17 of FIG. 16;

FIG. 18 is a fragmentary sectional view taken along line 18—18 of FIG. 15;

FIG. 19 is an enlarged fragmentary sectional view taken along line 19—19 of FIG. 2 and showing the bread supporting carriage in its bread toasting position;

FIG. 20 is an enlarged fragmentary sectional view taken along line 20—20 of FIG. 5;

FIG. 21 is a vertical sectional view taken along line 21—21 of FIG. 20;

FIG. 22 is an enlarged exploded perspective view of the cord connector of FIGS. 20 and 21;

FIG. 23 is a plan view of a modified form of toaster having four bread wells;

FIG. 24 is a side elevational view of the toaster of FIG. 23;

FIG. 25 is a left end elevational view of the toaster of FIG. 24;

FIG. 26 is a right end elevational view of the toaster of FIG. 24;

FIG. 27 is an inverted plan view of the toaster of FIG. 24; and

Figure 6:
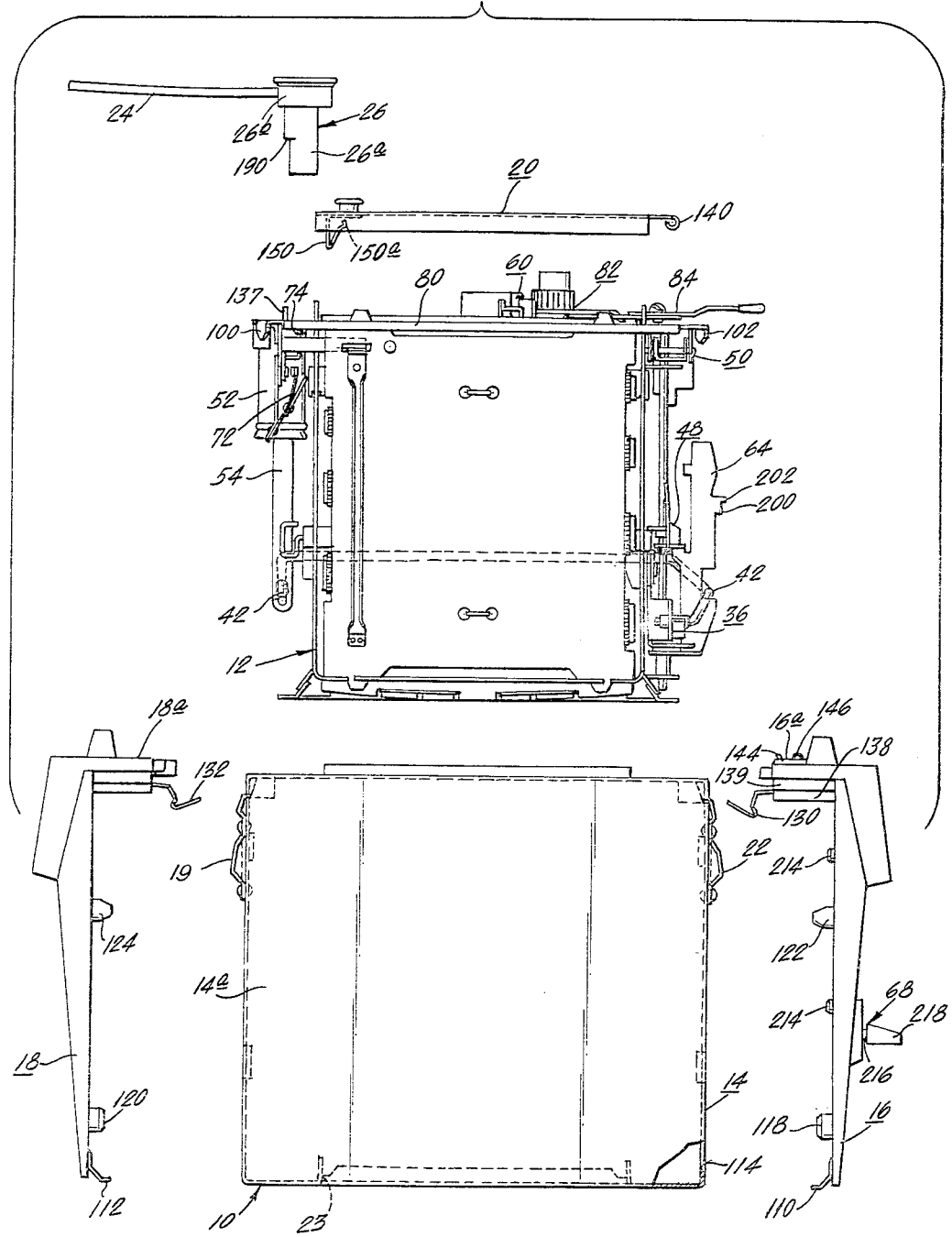
FIG. 6 is an exploded side elevational view, inverted with respect to FIG. 2, showing the component elements of the toaster detached but in related positions as they would appear prior to assembly.

Referring to FIGS. 1–5, there is illustrated a two-well toaster comprising a plurality of component parts which are coupled together in an operative form by manually releasable fastening means. The number of component parts employed and their interconnection may vary depending upon the desires of the manufacturer. The component parts for the toaster preferably comprise a limited number of easily assembled and replaceable elements, which are coupled together by fastening means not requiring tools for removal and disassembling of the component parts.

There is shown in FIGS. 1–6 a toaster comprising component parts including a housing generally designated 10 and a chassis generally designated 12, which is supported in the housing. The housing 10 in the present instance comprises an outer shell 14 providing a central housing portion, end covers 16 and 18, and a bottom closure or crumb tray 20. In the present instance, the outer shell 14 is generally U-shaped in cross-section providing open ends and an open bottom. Cross-tie brackets 19 and 22 are connected between the sides 14a and 14b at opposite ends of the shell adjacent the bottom of the shell, shown in inverted position in FIGS. 6, 13, and 14. The brackets provide strengthening of the shell and means for aligning other component parts in assembling the toaster, to be explained hereinafter.

The end covers 16 and 18 close the open ends of outer shell 14 and provide foot portions 16a and 18a, respectively, extending beneath the outer shell to provide the support for the toaster at opposite ends thereof. The bottom opening of the outer shell serves to permit entry of the chassis 12 into the outer shell so that the chassis may be enclosed within the housing, as indicated in the inverted exploded view of FIG. 6 showing the parts in related positions prior to assembly. The outer shell is provided with two elongated openings 21 and 23 providing entrances to bread wells in the chassis 12. Closure 20 serves as a crumb tray and closes the opening between the sides of outer shell 14 and the foot portions 16a and 18a of end covers 16 and 18, respectively.

An electric cord 24 is provided for supplying electrical current to heating means in the chassis and is connected to the toaster by a connector generally designated 26 which is suitable for being removed from the toaster, as indicated in FIG. 6. The component parts of the toaster shown in FIG. 6 are coupled together in an operable assembly by manually releasable fastening means associated with each component part, each fastening means being adapted to engage selectively at least one of the other component parts to hold the toaster parts firmly together.

The chassis 12 shown best in FIGS. 6, 13, 14, 15 and 19 has two bread wells 30 and 32 into which bread slices may be inserted through the entrance openings in the outer shell. The bread wells in the chassis are provided with grille wires and heaters (not shown) in a conventional manner. A bread supporting carriage generally designated 36, having bread-supporting racks 38 and 40 within the two bread wells, serves to support bread slices. The bread carriage is held in the toasting position by a latch mechanism generally designated 48 mounted on the carriage which is captured by a cooperating latch mechanism generally designated 50 mounted on the chassis when the carriage is moved downwardly, as shown in FIG. 19. Upon release of the latch mechanism 50 at the end of the toasting operation, carriage is urged upwardly by a spring located in dashpot 52, the spring being coupled to the carriage by lever 42 connected to link 54 and the carriage. The dashpot 52 also serves to limit the speed of upward movement of the carriage in a conventional manner.

The control of the toasting operation is performed by a bread-sensitive thermostat mechanism generally designated 60 supported by the chassis adjacent one of the bread wells, the thermostat being electrically connected to electro-magnetic apparatus generally designated 62 which releases latch mechanism 50. At the end of the toasting operation, the electro-magnetic apparatus is energized by closure of a switch in the thermostat to allow movement of the bread carriage upwardly by lever 42. The carriage is moved downwardly to lower the bread slice to toasting position by releasable latch means generally designated 66 slidably supported on the inside of end cover 16. A manually operable means 68 extends through an elongated vertical opening 70 in end cover 16 providing a handle for moving the latch means and member 64 of the bread carriage coupled to the latch, as shown in FIG. 12.

The electrical circuit of the toaster is completed for energizing the heating means by closure of on-off switch 72 operated by bread supporting rack 40. The switch 72 is closed when the carriage is in its lowermost position and open upon raising of the carriage upon completion of the toasting cycle. The input terminals of on-off switch 72, which has a double set of contacts, are electrically connected to downwardly extending terminal posts 74 and 76, as shown in FIGS. 15 and 20. Terminal posts 74 and 76 extend downwardly in the chassis to be engageable through opening 78 in bottom support plate 80 of chassis 12. Selection of the desired toast color is provided through adjustment mechanism generally designated 82 having a pivotally mounted adjustment arm 84 supported beneath the chassis and adapted to extend through an elongated horizontal opening 86 in end cover 16, as shown in FIGS. 3, 8 and 13.

For the most part, the parts of the chassis shown and described above are very much like parts usually found in chassis of oven toasters and will not be described in further detail, except for certain features of the chassis which cooperate to facilitate coupling together of the component parts of the toaster, as will be described hereinafter. It should be understood that any suitable chassis of this kind may be employed and that certain features of the chassis disclosed herein are shown and described in further detail in U.S. Patents of J. J. Lawser, Patent Nos. 3,035,509; 2,951,432; 2,796,492 and 2,747,072.

The peferred manner of assembly and interconnection of the component parts by the manually releasable fastening means coupling selectively the various component parts together will now be described. The component parts of the toaster are adapted to be assembled together in an inverted position of the parts as indicated in the inverted exploded side elevational view of FIG. 6. With the outer shell in the position shown in FIG. 6, the chassis is inserted through the bottom opening between sides 14a and 14b and cross-tie brackets 19 and 22. During this operation the chassis may be held by handles 90 and 92 stamped in the chassis support plate 80 beneath the bread wells, as shown in FIGS. 15 and 18. The cross-tie brackets 19 and 22 are connected to inwardly turned flanges of sides 14a and 14b of outer shell 14, as by rivets, shown in FIGS. 13–15. The brackets 19 and 22 have horizontally extending flanges 19a and 19b, and 22a and 22b, respectively, adjacent the sides 14a and 14b of the outer shell, as shown in FIG. 15. In the inverted position of the outer shell the horizontal flanges of the brackets support the corners of support plate 80 of the chassis.

The adjacent inwardly turned flanges 94 and 96 of bread entrances 21 and 23, respectively, as shown in FIG. 4, provide guide means cooperating with the longitudinally extending top plate 98 of chassis 12 in aligning the bread wells with the entrance openings of the outer shell. Further alignment of the chassis and outer shell in their assembly is provided by vertically extending alignment pins 100 and 102 on the chassis, formed by stamping vertically extending tabs at a pair of opposite corners of support plate 80, as shown in FIGS. 6 and 15–17, received in mating openings 104 and 106, respectively, in horizontal bracket flanges 19b and 22a, respectively. The alignment pins and mating openings provide positioning and alignment of the chassis in the outer shell to guide the chassis into the desired position and further serve to strengthen and rigidify the outer shell through binding of the alignment pins in the mating openings upon application of forces to the outer shell tending to deform the sides. Although the chassis may be inserted in the outer shell with the bread carriage 36 adjacent either end of the outer shell, it is preferable that one particular orientation be maintained so that the user may know which bread oven has the thermostat associated therewith for toasting one slice of bread at a time. In practice, one orientation may be marked on the outer shell so that the user, by merely observing indications on relative parts, will know that a predetermined arrangement is desired.

The end covers 16 and 18 are generally similar but end cover 16 is provided with the manually operable mechanism 68 for moving the bread carriage 36 between its bread receiving and bread toasting positions and with opening 86 to allow the color control arm 84 to project therethrough. Thus, end cover 16 is attached at the end of the shell at which bread carriage 36 and control arm 84 are located, as shown in FIGS. 7, 8 and 13. The manually releasable fastening means for end cover 16, and the manually releasable fastening means for end cover 18 which is like it, comprise clamps 110 and 112, respectively, which engage the inner surfaces of inwardly turned flanges 114 and 116, respectively, at the top of the outer shell, shown in inverted perspective views in FIGS. 13 and 14, respectively. The clamps 110 and 112 are carried by cylindrical projections, generally designated 118 and 120, respectively, molded on the inner faces of end covers 16 and 18, respectively, with locking washers over the projections. Clamps 110 and 112 extend a distance adjacent the end covers to serve as keepers to hold the respective flanges of the outer shell between the clamp and respective end cover. Flanges 114 and 116 provide pairs of ears 114a and 116a, respectively, which extend on opposite sides of clamps 110 and 112 to hold the clamps and hence the end cover against sideward movement. With the clamps of the end covers over the flanges of the shell, as shown for end cover 16 in FIG. 7, end covers 16 and 18 are pivoted toward the outer shell to have pairs of alignment members 122 and 124, respectively, on end covers 16 and 18, respectively, received in mating openings 126 and 128, respectively, in the flanges at opposite ends of the sides of the outer shell. The alignment members are molded as projections on the inner face of the end covers. As end covers 16 and 18 are moved into position against the outer shell, spring clips 130 and 132 providing latch members, attached to the inner surfaces of foot portions 16a and 18a, respectively, as by rivets, snap-over flanges 134 and 136, respectively, of an opening in support plate 80 of chassis 12, as shown by the operation of spring clip 130 in FIGS. 7 and 8, the operation of spring clip 132 being like it, as shown in broken lines in FIG. 15. A latching function is provided by spring clips 130 and 132 which snap-over flanges 134 and 136. In preferred embodiments of the toaster, it is contemplated that latch means will be provided which serve the function of these members.

In assembling the end covers to the outer shell and chassis, the clamps 110 and 112 are inserted in back of the flanges 114 and 116, respectively, as shown in the inverted views in FIGS. 7 and 8 and the end covers are moved downwardly and toward the outer shell. The alignment members 122 and 124 are provided with camming surfaces 122a and 124a, respectively, which engage the upper surfaces of the mating openings 126 and 128, respectively, to help move the end covers into the desired position and alignment with outer shell 14. The spring clips 130 and 132 associated with the end covers 16 and 18, respectively, are provided with camming surfaces 130a and 132a, which engage flanges 134 and 136, respectively, of the chassis plate 80 to firmly seat the end covers against the ends of the outer shell in conjunction with the clamps at the opposite ends of the end covers. Since end cover 18 does not have an opening for color control arm 84, end cover 18 cannot be assembled to the chassis on the end having color control arm 84 and member 64 of the bread carriage. In order to prevent end cover 16 from initially being assembled to the end of the chassis not having color control arm 84, a downwardly extending tab 137 stamped in chassis support plate 80, as shown in the inverted views of FIGS. 6 and 15, is provided to engage flange 138 of rib 139, which is formed as an integral part of foot portion 16a, as shown in FIGS. 6 and 13. This engagement between tab 137 and flange 138 prevents end cover 16 from being assembled to the chassis at the end not having color control arm 84.

The crumb tray 20 is provided at the bottom of the toaster and closes the space between the foot portions 16a and 18a and extends between the sides 14a and 14b of the outer shell. The crumb tray 20 is releasably hinged at one end to foot portion 16a and is coupled at its other end by a spring clip to foot portion 18a, as shown in FIGS. 8 and 20. The releasable hinge arrangement for the tray includes having one end of the tray rolled into a hinge pin 140, as shown in FIGS. 8 and 13, and a pair of brackets designated 144 attached to foot portion 16a, the brackets being provided with detents for receiving the ends of hinge pin 140. Each end of the hinge pin is releasably held in the detents of the pair of brackets 144 by a pair of leaf springs 146 attached to the foot portion, one spring associated with each bracket, as shown for one of the brackets and springs in FIGS. 7 and 8.

The other end of the crumb tray has a spring clip attached to its inner surface as by a rivet, the rivet also holding a handle to the crumb tray to be grasped by the operator when moving the tray. Spring clip 150 is resiliently forced to engagement with the inner wall of U-shaped bend 154a in bracket 154, which is attached to foot portion 18a as by screws. It should be observed that spring clip 150 has its free end bent into a generally U-shaped form such that the free end 150a of the clip is resiliently compressed upon engagement with bracket 154, thereby exerting a force to pull the end covers 16 and 18 firmly against the ends of outer shell 14.

Connector 26 has a plug portion 26a, shown in FIGS. 6, 19, 20 and 21, which is received in a socket generally designated 160, formed in the foot portion 18a as a recess in the course of molding the foot portion and completed by bracket 154. Plug portion 26a of the connector extends into the socket and through opening 78 in support plate 80 of the chassis. Terminal means in the connector are adapted to engage the terminals 74 and 76 for connecting the toaster terminals to a source of electrical power.

In the preferred embodiment of the connector 26, as shown in FIGS. 20–22, the connector when positioned in socket 160 has an increased dimension portion 26b which overlaps foot portion 18a adjacent its support leg and overlaps a portion of the crumb tray to provide an interlock between the components so that the connector must be removed before the other components can be disassembled. The connector portion 26b is of a thickness to lie between the underside of the foot portion and the surface on which its support leg rests.

Connector 26 is composed of a two-piece unit of molded resinous material comprising a top plate 164 having downwardly extending legs 164a and 164b and a T-shaped bottom portion generally designated 166 with the tongue of the T providing the plug portion 26a. The top of the T-shaped portion 166 has a raised, reduced cross-section portion 168 to fit within the sidewalls of the top plate 164.

Electric cord 24 extends through an opening 170 in the side of the connector and into a serpentine-shaped passage 172 in the raised portion 173. Wires 174 and 176 extend into the compartments 178 and 180, respectively, separated by web 182 in T-shaped portion 166 and are connected to terminal pinch clips 184 and 186 respectively. The bottom of T-shaped portion 166 has reduced cross-section openings 187 and 188 communicating with each compartment 178 and 180, respectively, the openings being adapted to permit the toaster terminals 74 and 76 to enter the compartments between the jaws of the terminal pinch clips but being of a size to retain the terminal clips within the compartments. The top and bottom portions 164 and 166 of the connector are made to fit together, the bottom portion being snugly received within the top and abutting a shoulder so that any convenient means such as rivets may be used to hold them together. With the connector assembled the legs 164a and 164b hold terminal clips 184 and 186, respectively, in the compartments as they engage terminals 74 and 76.

The electrical cord may be of a conventional type, such as HPN conventional heater cord of copper stranded wires with a neoprene rubber insulation. In order to have the cord withstand a force tending to pull the cord and wires free of the connector and terminal clips, and avoid having the copper wires slide within the rubber insulation during such times, it is desirable to have the rubber insulating jacket held to the copper wires within the connector. By clamping the wires and insulating jacket in the connector the wires can be inhibited from being pulled free of the connector. The serpentine-shaped passage 172 through which the cord passes in the connector is of a cross-section such the cord must be press fitted therein. Passage 172, as shown in FIGS. 21 and 22, preferably has a generally U-shaped outer wall 172a and a T-shaped inner wall 172b, with the tongue of the T extending between the legs of the U-shaped outer wall. The cord is particularly clamped in the passage by the tops of the legs of the U-shaped wall and the top of the T and by the sharp bend of the U and tongue of the T-shaped wall. With the cord press fitted within the passage, a thirty-five pound force tending to pull the cord from the side of the connector has been applied for sixty seconds without the force being transmitted to the terminal clips.

A shoulder 190 is provided on the plug portion 26a of the connector to fit within the socket in one orientation of the connector so that the cord extending through the side of the connector extends through an opening in the support leg of foot portion 18a, as shown in FIG. 20. The raised portion 173 of T-shaped connector portion 166 is provided with a second serpentine-shaped passage 192, similar to passage 172, so that a parallel connected cord from cord 24 may extend through the passage 192 and be connected to a similar connector, two connectors with a parallel connected cord being used in the four-well toaster, to be described hereinafter.

When the component parts of the toaster are assembled as previously described, the connector may be inserted within the socket with the toaster in its inverted position and then the toaster may be turned over to rest on its foot portions for operation.

With the toaster in its operational position resting on its foot portions, the manually operable latch means 66 associated with the manual lifter assembly for moving the bread support carriage between its bread receiving and bread toasting positions must be engaged with the bread support carriage. 36. To this end the arm 64 of the bread support carriage is provided with projection 200 extending toward end cover 18 and a further projection 202 of reduced dimension extending from projection 200, as shown in FIGS. 11 and 12 and in the inverted view of the toaster of FIG. 7. The projections 200 and 202 of arm 64 provide a catch member and, more specifically, projection 202 will hereinafter be referred to as a first catch portion and increased dimension projection 200 will hereinafter be referred to as a second catch portion, the catch portions being adapted to be engaged by latch member 204 slidably supported on end cover 16.

As shown in the inverted views of end cover 16 in FIGS. 9 and 13, resilient latch member 204 is supported by slide 206, which is arranged for sliding connection with guide panels 208 and 210. The parallel oriented guide panels 208 and 210 are attached to the inner surface of end cover 18 by lock washers 212 which are pressed over cylindrical projections 214 molded on the inner surface of the end plate and extending through the guide panels. A clearance is provided between the guide panels and end cover for movement of the slide. Slide 206 is provided by a metal plate overlying the sides of the guide panels adjacent the end cover and has ears 206a at its corners bent out of the plane of plate 206 to overlie the opposite sides of guides 208 and 210. The manually operable portion 68 for moving the bread carriage between its bread receiving and bread toasting positions is provided by arm 216 extending through elongated openings 70 in end plate 16, arm 216 being attached to slide 206 as by rivets and having attached at its free end a lifter handle 218. The slide moves along the guides between its lowermost position in which arm 216 abuts the bottom of opening 70 and its uppermost position in which arm 216 abuts against the top of opening 70. The limits of movement of the latch member on the slide is slightly greater than the movement of the catch member of the carriage between its bread toasting and bread receiving positions.

The resilient latch member 204 is attached to the slide as by a rivet and extends outwardly from the slide toward the carriage and is bent back toward the slide with a T-shaped end 222, having the tongue of the T passing through an opening 224 in the slide and the top of the T on the opposite side of the slide, as shown in FIGS. 9, 11 and 13. The free T-shaped end 222 of the resilient latch member 204 permits the latch member to be moved toward the slide within opening 224, as shown in FIG. 11, as the catch member and latch member engage. The latch member is provided with a latch opening 226 in its outermost projecting surface and provides camming surfaces 228 and 230 to urge the latch member toward the slide as the latch member moves against the catch member from either direction so that the catch portions 200 and 202 may pass over the latch member to latch opening 226. More specifically, the latch member is biased into the path of movement of the catch member with camming surfaces and latch opening in overlapping relationship such that the latch member must ride over the catch member when the latch assembly is moved by the lifter handle 218 after the end cover 18 is fastened to the outer shell, as shown in FIGS. 11 and 12 and the inverted view of FIG. 8.

With the bread carriage in the bread receiving position, as shown in the inverted view of FIG. 8, when the latch slide assembly is moved to its extreme position toward the top of the toaster, shown inverted in FIG. 8, the latch opening only engages the first catch portion 202. With the latch member coupled to the first catch portion 202 the lifter is operable to move the bread carriage to its bread toasting position. In the bread toasting position of the carriage, it is held down for the toasting operation by the latch mechanism 50, as shown in FIG. 19. With the bread carriage latched in its toasting position, slight upward movement of the lifter handle will move the latch member upwardly to ride up the second catch portion 200 until the latch opening captures the second catch portion, as shown in FIG. 12.

It should be appreciated that if the bread support carriage is in its toasting position when the side panel 16 is assembled, movement of the lifter mechanism over its path of movement will enable the latch opening of the latch member to engage both catch portions initially, as should be appreciated from FIG. 12. Thus, whichever position the bread support carriage is in when the side panel 16 is assembled, movement of the lifter mechanism will enable the latch member to engage the catch member, either the first catch portion initially or the entire catch member upon one complete cycle of movement of the lifter mechanism from its top position. This arrangement assures operative association of parts irrespective of the position of the manually operable lifter mechanism and the bread support carriage at the time of assembly of the parts. By having the latch member engage only the first catch portion initially when the carriage is in its bread receiving position, and then engage the second catch portion or the entire catch member when the carriage is in its bread toasting position, the lifter arm 216 will be biased against the top of the slot 70 of end cover 16 whenever the carriage returns to its bread receiving position. This arrangement is desirable in order to have the handle 218 consistently positioned in relation to the end cover in a desired aesthetic design arrangement when the carriage is in its bread receiving position.

It should also be appreciated that when the toaster is assembled as shown in FIG. 2, in order for the toaster to be disassembled or crumbs removed from the toaster, the crumb tray 20 must be opened or removed. Since the connector overlaps a portion of the crumb tray, the connector must first be removed.

Thus, it is assured that the toaster will be disengaged from the source of power for safety of the user before the crumb tray can be opened.

The features of the present invention, shown and described in regard to the two-well toaster of FIGS. 1–22 can be applied to a toaster having more than two bread-toasting ovens. Referring to FIGS. 23–27, there is illustrated, for example, a four-well toaster comprising a plurality of component parts, somewhat similar to those shown and described in regard to the two-well toaster, which are fastened together by a manually releasable fastening means for coupling the parts together in an operable form. The number of component parts employed and their interconnection may vary depending on the desires of the manufacturer. The component parts for the toaster shown in FIGS. 23–27 comprise an outer shell 250 providing a central housing portion, end covers 252 and 254, and two bottom closures or crumb trays 256 and 258. In the present instance, in a manner similar to the toaster of FIGS. 1–6, the outer shell is generally U-shaped in cross-section providing open ends and an open bottom and would have cross-tie brackets connected between the sides to provide strengthening means for the chassis and alignment means for a pair of two-well chassis 260 and 262 (shown in dotted lines in FIGS. 23 and 25). The chassis 260 and 262 would preferably be the same as chassis 12 of FIG. 6 and the cross-tie brackets of the outer shell would be suitably adapted with mating openings for the aligning members of the chassis, as previously described for the two-well toaster.

Each end cover would be provided with pairs of clamps and spring clips to engage each side of the outer shell and each chassis, in a similar manner to the end covers for the two-well toaster. End cover 254 is provided with a pair of lifter-latch mechanisms for engaging the arms of each bread carriage in a manner as previously described. An electric cord 264 is provided for supplying electrical current to the heating means in the chassis and is connected by connector 266 to the terminals of chassis 260 with a parallel connected cord connected from the first connector 266 to a second connector 270 to the terminals of the second chassis 262. The connectors would be positioned in sockets in end cover 252 to overlap the respective crumb trays, as described in regard to the connector for the two-well toaster. The connectors for the four-well toaster would be similar to the connector shown and described in FIGS. 20–22, the connector of FIG. 21 having openings in its ends for the arrangement of the cords indicated in FIG. 27.

It should be appreciated that the arrangement of component parts and connecting means for the two-well toaster can be applied to toasters having four or more wells. In order to remove the chassis from the four-well toaster, the connectors 266 and 270, crumb trays 256 and 258 and end covers 252 and 254 must be removed, so that the desired chassis could be lifted from and replaced in the outer shell through its bottom opening.

Figure 28:
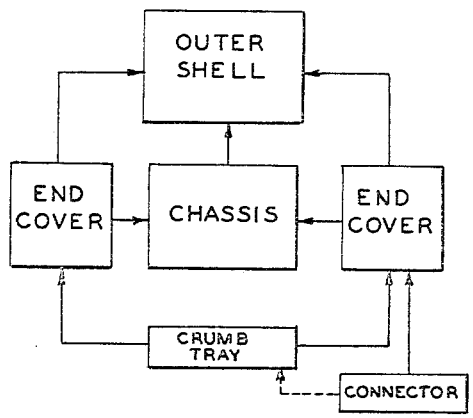
FIGS. 28 to 32 are diagrammatic illustrations representing toaster component elements and representative modes of assembling the elements.

It should be understood that the number of component parts employed in the toaster may vary depending on the desires of the manufacturer, the specific arrangement shown in FIG. 6 being a preferred number of component parts and a preferred means of interconnecting the parts by manually releasable fastening means. The interconnection of the component parts in FIG. 6 is schematically illustrated in FIG. 28, which indicates the component parts with arrows designating the selected connection between the parts. As indicated in FIG. 27, the chassis is inserted in the outer shell and the end covers are each coupled to the chassis and outer shell. The crumb tray is releasably coupled to each end cover and the cord connector is coupled to the right end cover and overlaps the crumb tray, in effect contacting the crumb tray, so that the crumb tray cannot be removed with the toaster electrically connected to a source of power.

Figure 29:
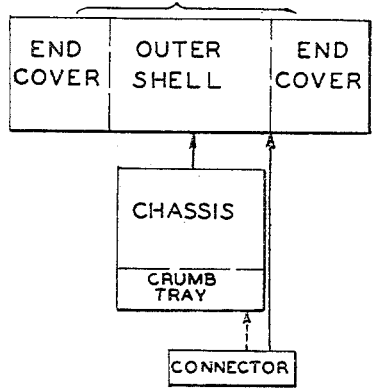
Figure 32:
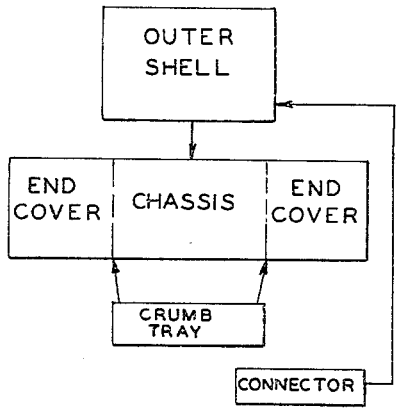

As previously stated, fewer component parts could be employed in the toaster in accordance with the present invention. As indicated in the schematic diagram of FIG. 29, the outer shell and end plates may comprise a unit housing and the chassis and crumb tray may provide a second component part, which are interconnected to the housing by manually releasable fastening means. A connector plug for the cord is shown coupled to the housing for engagement with the terminals of the chassis. In this case, preferably, the chassis cannot be removed from the housing without disconnecting the connector from the toaster terminals.

Figure 30:
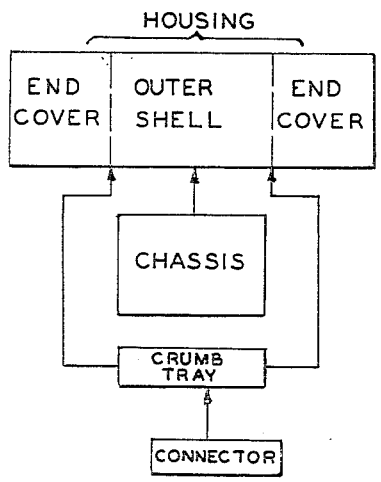

A further modification would be to have the crumb tray as a separate component part as indicated in the schematic diagram of FIG. 30. The crumb tray is coupled to opposite ends of the housing with the connector coupled through the crumb tray to the chassis so that the connector must be removed before the crumb tray can be opened to provide access to the chassis.

Figure 31:
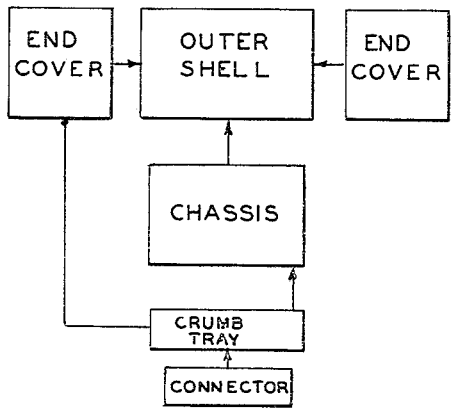

Still a further modification is shown in the schematic diagram of FIG. 31 having the same number of component parts as the toaster of FIG. 6 but showing a different interconnection. In FIG. 31 the end covers are indicated coupled to the outer shell, and the chassis is coupled to the outer shell. The crumb tray would be hinged to one end cover as a unit and releasably coupled to the other end cover. In this arrangement the connector plug could pass through the crumb tray to connect to the terminals of the chassis.

Another modification would be to have the end covers permanently connected to the chassis as a unit part and the outer shell coupled to the chassis by manually releasable fastening means. The crumb tray is shown coupled to the ends of the chassis with the connector plug inserted through the outer shell for coupling to the chassis terminals.

It should be appreciated that many other interconnections between the housing, chassis and connector plug may be made with the parts coupled together in accordance with the invention to provide disassembly of component parts without the use of tools. The schematic diagrams of FIGS. 28–32 merely indicate a few of the numbers of possibilities for each part to be selectively coupled to at least one of the other parts of the toaster. It should be also appreciated that the number of component parts employed in the toaster could be enlarged, for example, to have the bread-sensitive thermostat, generally designated 60 in FIG. 15, as a separate component part which is releasably coupled to the chassis by manually releasable fastening means. In this manner, if the bread-sensitive thermostat malfunctions, by disassembling the component parts, the thermostat could be manually released from the chassis and replaced with a new thermostat. Furthermore, the heating elements in the bread oven of the chassis could also be made as separable parts releasably coupled in the chassis so that they could be manually released and replaced if they became defective.

It will be observed that the toaster of the present invention comprising component parts coupled together by a manually releasable fastening means provides advantages over the prior art toasters. The releasable fastening means for selectively coupling component parts together in an operative form may be simply and inexpensively manufactured for quick and easy assembly of the parts without using tools. Moreover, if the toaster is dropped breaking any portion of the housing or if a malfunction occurs in the chassis, the toaster parts can be easily and quickly disassembled without using tools by the unskilled user, who may install the replacement part without expensive labor costs. Furthermore, the alignment means employed to selectively position relative parts assures proper alignment of the parts in an operative form and the lifter-latch mechanism enables accurate and easy connection with the bread supporting carriage for operation of the toaster. The safety feature of employing a detachable connector for the toaster cord prevents electrical shock to the user when opening the crumb tray or disassembling the toaster into its component parts.

We claim:

1. A toaster comprising at least three manually releasable components parts other than a cord connector, the components including at least a chassis component having at least one oven and having heating means on opposite sides of the oven and a component serving as at least a portion of a housing for the chassis, at least one of the components having manually releasable latch means fixed thereto for coupling to at least one of the other components to hold the components together in an operative form without the use of tools.

2. A toaster comprising component parts including a chassis component having at least one oven and having heating means on opposite sides of the oven, a housing component adapted to receive the chassis therein and having an opening cooperable with the oven in the chassis, one of the components having manually releasable latch means fixed thereto for operatively coupling the chassis to the housing whereby upon manual release of the latch means the chassis may be removed from the housing.

3. The toaster of claim 2 in which the latch means comprises a resilient latch member operatively connected between the chassis and the housing.

4. The toaster of claim 2 further including an electric cord having a pair of wires for supplying electrical current to the heating means, the heating means having a pair of electrical terminals engageable through an opening in the chassis, the housing having an opening permitting access to the terminals, a connector into which the cord extends and which is positionable through the housing adjacent the terminals, and a pair of electrical terminal means supported by the connector, each connected to a different one of the wires and supported such that each terminal means is adapted to releasably engage one of the terminals of the heating means, the connector providing an interlock such that the connector must be removed before the chassis can be removed from the housing.

5. A toaster comprising component parts including a chassis component having at least one oven and having heating means on opposite sides of the oven, a housing component adapted to receive the chassis therein and having an opening cooperable with the oven in the chassis, the components having manually releasable fastening means for operatively coupling the chassis to the housing whereby upon manual release of the fastening means, the chassis may be removed from the housing, an electric cord having a pair of wires for supplying electrical current to the heating means, the heating means having a pair of electrical terminals engageable through an opening in the chassis, the housing having an opening permitting access to the terminals, a connector into which the card extends and which is positionable through the housing adjacent the terminals, and a pair of electrical terminal means supported by the connector, each terminal means connected to a different one of the wires and supported that each terminal means is adapted to releasably engage one of the terminals of the heating means, the connector extending through the housing in the opening provided for the connector and engaging the terminals of the heating means such that the connector must be removed from the terminals before the chassis can be removed from the housing.

6. The toaster of claim 2 in which the housing is provided with guide means for guiding the chassis into the housing and the chassis is provided with cooperating guide means for positioning the chassis in the housing.

7. The toaster of claim 2 in which the housing receives the chassis through a bottom opening, the chassis is provided with projecting alignment members at opposite corners of its bottom and the housing is provided with mating alignment openings at its bottom adapted to receive the alignment members for positioning the chassis in the housing.

8. The toaster of claim 2 further including a crumb tray having manually releasable fastening means for coupling the tray to other components.

9. A toaster comprising component parts including a chassis component having at least one oven and having heating means on opposite sides of the oven, a housing component adapted to receive the chassis therein and having an opening cooperable with the oven in the chassis, the components having manually releasable fastening means for operatively coupling the chassis to the housing whereby upon manual release of the fastening means the chassis may be removed from the housing, a crumb tray having manually releasable latch means connected between the crumb tray and at least one of the other components, an electric cord having a pair of wires for supplying electrical current to the heating means, the heating means having a pair of electrical terminals engageable through an opening in the chassis, the housing having an opening permitting access to the terminals, a connector into which the cord extends and which is positionable through the housing adjacent the terminals, and a pair of terminal means supported by the connector, each terminal means connected to a different one of the wires and supported such that each terminal means is adapted to releasably engage each terminal of the heating means, the connector having a portion of increased area overlapping at least a portion of the crumb tray such that the connector must be disengaged from the terminals before the crumb tray can be unlatched, the housing being arranged such that the crumb tray must be unlatched before the chassis is removable from the housing.

10. A toaster comprising component parts including a chassis having at least one oven with a supporting carriage engageable at one end of the chassis for movement between a receiving position and a toasting position and having heating means on opposite sides of the oven; a hollow housing having an opening in its bottom and having at least one end opening, one of the openings of the housing being adapted to receive the chassis therein such that the end opening permits access to the engageable bread supporting carriage; an end cover for closing the end opening and having first manually releasable fastening means connected between the end cover and at least one of the other components; manually releasable latch means associated with the end cover for operatively engaging the supporting carriage and having means for raising and lowering the carriage when the end cover is fastened in position; and a closure for closing the bottom opening of the housing and having second manually releasable fastening means connected between the closure and at least one of the other components, the components being fastened together such that the chassis will be supported in the housing and may be removed by release of the manually releasable means.

11. The toaster of claim 10 in which the supporting carriage is provided with a catch member engageable at the one end of the chassis, and the manually releasable latch means comprises a latch member slidably supported on the end cover for engaging the catch member and manually operable means connected to the latch member for moving the carriage between its receiving and toasting positions when the end cover is fastened in position.

12. The toaster of claim 11 in which the latch means further comprises retaining guide means on the end cover alinged with the path of movement of the catch member of the carriage and the latch member is slidably supported by the guide means and is biased in overlapping relation to the catch member along its path of travel for being held by the catch member when the end cover is fastened in position.

13. The toaster of claim 12 in which the catch member includes a first catch portion extending outwardly from the carriage and a second catch portion extending outwardly from the first catch portion such that when the carriage is in its receiving position the latch member along its path of travel will only engage the second catch portion and when the carriage is moved downwardly by the manually operable means the latch member may engage the first catch portion so that when the carriage is returned to its receiving position the manually operable means will be biased to one extreme of its movement.

14. The toaster of claim 10 in which the end cover is provided with alignment members and the housing is provided with mating positioning means adapted to receive the alignment members for positioning the end cover in a predetermined relationship to the housing.

15. The toaster of claim 10 in which the chassis is provided with alignment members and the housing is provided with mating alignment means adapted to receive the alignment members for positioning the chassis in the housing.

16. The toaster of claim 10 in which the first manually releasable fastening means comprises a keeper supported by the end cover and adapted to releasably couple the end cover to one of the other components, and a resilient latch member supported by the end cover and having a camming surface for releasably engaging one of the other component parts to firmly hold the end cover fastened in position.

17. The toaster of claim 16 in which the end cover is provided with alignment members and the housing is provided with mating positioning means adapted to receive the alignment members for positioning the end cover in a predetermined relationship to the housing.

18. The toaster of claim 17 in which the alignment members are provided with camming surfaces adapted to engage the positioning means such that the keeper will firmly hold a surface of the one of the other components to the end cover.

19. The toaster of claim 10 in which the second manually releasable fastening means comprises releasable hinge means connected between one end of the closure and the housing and a resilient releasable latch member connected between the closure and end cover for resiliently urging the closure and end cover together.

20. A toaster comprising component parts including a chassis having at least one oven with a supporting carriage engageable at one end of the chassis for movement between a receiving position and a toasting position and having heating means on opposite sides of the oven; a hollow housing having an opening in its bottom and having openings in opposite ends, one of the openings being adapted to receive the chassis therein such that one end opening permits access to the engageable supporting carriage; a first end cover for closing the one end opening of the housing permitting access to the suppporting carriage and having first manually releasable fastening means connected between the first end cover and at least one of the other components; manually releasable latch means associated with the first end cover for operatively engaging the supporting carriage and having means for raising and lowering the carriage when the first end cover is fastened in position; a second end cover for closing the other end opening of the housing and having second manually releasable fastening means connected between the second end cover and at least one of the other components; and a closure for closing the bottom opening of the housing and having third manually releasable fastening means connected between the closure and at least one of the other components, the components being fastened together such that the chassis will be supported in the housing and may be removed by release of the manually releasable means.

21. The toaster of claim 20 in which the third manually releasable fastening means comprises releasable hinge means connected between one end of the closure and one of the end covers and a resilient releasable latch member connected between the closure and the other end cover for resiliently urging the closure and end covers together.

22. The toaster of claim 20 in which the toaster further includes an electric cord having a pair of wires for supplying electric current to the heating means, the heating means having a pair of electrical terminals engageable through an opening in the chassis, one of the components having an opening permitting access to the terminals, a connector into which the cord extends and which is positionable through the opening in the one component, and a pair of electric terminal means supported by the connector, each connected to a different one of the wires and supported such that each terminal means releasably engages one of the terminals of the heating means.

23. The toaster of claim 22 in which the closure is provided with a portion which cooperates with the connector such that the connector must be removed before the closure can be released from its associated components by release of the third manually releasable fastening means.

24. A toaster comprising a plurality of component parts including a chassis component having at least one oven and having heating means on opposite sides of the oven, and a housing component adapted to receive the chassis therein and having an opening cooperable with the oven in the chassis, one of the components having manually releasable latch means fixed thereto for operatively coupling the chassis to the housing whereby upon manual release of the latch means the chassis may be removed from the housing, the chassis having alignment means and the housing having mating positioning means for positioning the chassis in the housing in a predetermined relationship.

25. The toaster of claim 24 in which the components have mating means to provide contours such that the components can be assembled together in only one possible orientation in order to avoid errors in assembly.

26. The toaster of claim 24 in which the housing is provided with a bottom opening, the toaster further comprising a closure for the bottom opening having manually releasable fastening means for coupling the closure to other components.

27. The toaster of claim 24 in which the housing at one end has a first end opening and at its other end has a second end opening, the toaster further comprising a first end cover for closing the first end opening and a second end cover for closing the second end opening, the latch means including first manually releasable latch means fixed to the first end cover and connected between the first end cover and at least one of the other component parts, and second manually releasable latch means fixed to the second end cover and connected between the second end cover and at least one of the other component parts.

28. The toaster of claim 27 in which the first and second end covers are provided with alignment means and at least some of the other components are provided with mating positioning means for positioning the components in a predetermined relationship.

29. The toaster of claim 28 in which the components have mating means to provide contours such that the components can be assembled together in only one possible orientation in order to avoid errors in assembly.

30. The toaster of claim 27 in which the first and second manually releasable latch means each comprise a resilient latch member.

31. A toaster comprising a plurality of component parts including a chassis component having at least one oven and having heating means on opposite sides of the oven, a housing component adapted to receive the chassis therein and having an opening cooperable with the oven in the chassis, the housing at one end having a first end opening and at its other end having a second end opening, a first end cover for closing the first end opening, and a second end cover for closing the second end opening, the first end cover having first manually releasable fastening means connected between the first end cover and at least one of the other component parts, the second end cover having second manually releasable fastening means connected between the second end cover and at least one of the other component parts, the first manually releasable fastening means on the first end cover comprising a keeper supported by the first end cover and engageable with a portion of the housing and a resilient latch member supported by the first end cover and engageable with the chassis, the manually releasable fastening means operatively coupling the chassis to the housing whereby upon manual release of the fastening means the chassis may be removed from the housing, the chassis having alignment means and the housing having a mating position means for positioning the chassis in the housing in a predetermined relationship.

32. A toaster comprising a plurality of component parts including a chassis component having at least one oven and having heating means on opposite sides of the oven, a housing component adapted to receive the chassis therein and having an opening cooperable with the oven in the chassis, the housing at one end having a first end opening and at its other end having a second end opening, a first end cover for closing the first end opening, a second end cover for closing the second end opening, the first end cover having first manually releasable fastening means connected between the first end cover and at least one of the other component parts, the second end cover having a second releasable fastening means connected between the second end cover and at least one of the other component parts, the housing having a bottom opening, a closure for the bottom opening, the closure having first latch means connected between the closure and the first end cover and having second latch means connected between the closure and the second end cover for resiliently urging the closure and end covers together, the manually releasable fastening and latch means operatively coupling the chassis to the housing whereby upon manual release of the fastening and latch means the chassis may be removed from the housing, the chassis having alignment means and the housing having a mating position means for positioning the chassis in the housing in a predetermined relationship.

33. A toaster comprising a plurality of component parts including a chassis component having at least one oven and having heating means on opposite sides of the oven, a housing component adapted to receive the chassis therein and having an opening cooperable with the oven in the chassis, the housing having an end opening, the chassis having a supporting carriage engageable at one end of the chassis for movement between receiving and toasting positions in the oven, the chassis being received in the housing such that the end opening in the housing permits access to the engageable supporting carriage, an end cover for closing the end opening and having manually releasable fastening means connected between the end cover and at least one of the other components, and manually releasable latch means associated with the end cover for operatively engaging the supporting carriage and having means for raising and lowering the carriage when the end cover is fastened in position, the manually releasable fastening means operatively coupling the chassis to the housing whereby upon manual release of the fastening means the chassis may be removed from the housing, the chassis having alignment means and the housing having a mating position means for positioning the chassis in the housing in a predetermined relationship.

34. The toaster of claim 33 in which the manually releaseable latch means is positioned for being engageable with the supporting carriage when the fastening means of the end cover is fastened to the at least one of the other components and is manually releasable from the supporting carriage when the fastening means of the end cover is released.

35. A toaster comprising a plurality of component parts including at least a chassis having at least one oven with heating means; a hollow housing having an opening in its bottom and having at least one end opening, one of the openings of the housing being adapted to receive the chassis therein; an end cover for closing the end opening and having first manually releasable latch means fixed thereto and connected between the end cover and at least one of the other components; a closure for closing the bottom opening of the housing and having second manually releasable latch means fixed thereto and connected between the closure and at least one of the other components, the components being fastened together such that at least one component part other than the end cover and closure components is so arranged that when the latch means are effective the at least one component part is coupled with at least two of the other components.

36. The toaster of claim 35 in which the at least one component part coupled with at least two of the other components is the chassis.

37. The toaster of claim 35 in which some of the components are provided with alignment members and other components are provided with mating positioning means for positioning the components in a predetermined relationship.

38. The toaster of claim 37 in which the components have mating means to provide contours such that the components can be assembled together with the other components in only one possible orientation in order to avoid errors in assembly.

39. The toaster of claim 35 in which the end cover is releasably coupled to the housing, chassis and closure components.

40. The toaster of claim 2 in which the manually releasable latch means is fixed to the housing component and engages the chassis component to hold the components together in operative form.

41. The toaster of claim 40 in which the housing component includes an outer shell, a first end cover and a second end cover, the end covers each having the manually releasable latch means fixed thereto for engaging the chassis.

42. The toaster of claim 41 in which each of the latch means of the first and second end covers comprises a resilient latch member.

43. The toaster of claim 42 in which each resilient latch member has a camming surface adapted to urge the end cover toward the chassis.

44. The toaster of claim 41 in which a first keeper is fixed to the first end cover and adapted to couple the first end cover to the outer shell, and a second keeper is fixed to the second end cover and adapted to couple the second end cover to the outer shell.

45. The toaster of claim 2 in which the chassis encludes a supporting carriage operable in the oven and engageable for movement between a receiving position and a toasting position, the housing further including means for permitting engagement of the supporting carriage when the components are fastened together in operative form.

46. The toaster of claim 45 in which the means to permit engagement of the carriage includes an opening in the housing to permit engagement of the carriage between its receiving and toasting positions.

47. The toaster of claim 2 in which the housing is provided with a bottom opening, the toaster further including a closure component for closing the bottom opening of the housing and having hinge means at one end coupled to the housing and having manually releasable latch means near the other end of the closure for coupling the closure to the housing, the latch means being arranged to resiliently urge the housing and closure together.

48. A toaster comprising component parts including a chassis having at least one oven with a supporting carriage engageable for movement between a receiving position and a toasting position, a hollow housing adapted to receive the chassis therein and having at least one end opening, and an end cover for closing the end opening and having manually releasable latch means fixed thereto for coupling the end cover to at least one of the other components to fasten the components together in an operative form, the housing and end cover components fitting together such that means is provided on one of the components to permit engagement of the supporting carriage when the components are fastened together in operative form.

49. The toaster of claim 48 in which the one of the components having the means to permit engagement of the supporting carriage is the end cover.

50. The toaster of claim 49 in which the means to permit engagement of the carriage comprises manually releasable latch means slidably supported on the end cover for operatively engaging the supporting carriage when the end cover is fastened in position.

51. The toaster of claim 48 in which the one of the components having the means to permit engagement of the supporting carriage is the housing component.

52. The toaster of claim 51 in which the means to permit engagement of the carriage comprises latch means slidably supported on the housing for operatively engaging the supporting carriage when the chassis is operatively positioned in the housing.

53. The toaster of claim 48 in which the means to permit engagement of the carriage includes an opening in the one of the components to permit engagement of the carriage between its receiving and toasting positions.

54. A toaster comprising at least three component parts other than a cord connector coupled together in manually releasable engagement, manually releasable latch means fixed to at least one of the components for coupling to at least one of the other components to hold the components interlocked together in operative form whereby upon manual release of the latch means the components may be disassembled.

55. The toaster of claim 54 in which at least two components have manually releasable resilient latch means fixed thereto for being coupled to at least one other component.

56. The toaster of claim 54 in which one of the components is a chassis having at least one oven and having heating means on opposite sides of the oven, the chassis component being arranged such that when the latching means is effective the chassis is interlocked with other components.

57. A method of providing a toaster of the type having components including chassis, housing and end covers, the toaster having a quick disconnect feature without the use of tools for simple disassembly and assembly for cleaning, repair and the like, comprising the steps of: forming the housing with surfaces interfitting with the chassis whereby the chassis may be supported in the housing for strengthening of the housing, affixing latch means to at least two of the components, and providing at least one of the other components with a cooperating latch surface such that upon latching the components are biased together in operative form.

58. The method of claim 57 further including forming interfitting surfaces on the components for alignment and positioning so that the components can be easily assembled together and in only one orientation.

59. A method of providing a toaster of the type having components including chassis, housing and end covers, the toaster having a quick disconnect feature without the use of tools for simple disassembly and assembly for cleaning, repair and the like, comprising the steps of: forming the housing with surfaces interfitting with the chassis whereby the chassis may be supported in the housing, latching the components together in operative form by manually releasable latch member fixed to at least two of the components other than the chassis for coupling the components together, and assembling the components to interlock the chassis in the housing.

60. The method of claim 59 in which the chassis is provided with at least one oven with a supporting carriage engageable for movement between receiving and toasting positions, the method further including affixing releasable latch means to one of the other components for operatively engaging the supporting carriage, and latching the components together such that when the manually releasable latch members are effective the latch means is engageable with the carriage.

61. A method of providing a toaster of the type having components including at least a chassis having at least one oven and having heating means on opposite sides of the oven and a housing adapted to receive the chassis therein, the toaster having a quick disconnect feature without the use of tools for simple disassembly and assembly for cleaning, repair and the like, comprising the steps of: forming the housing with surfaces interfitting with the chassis whereby the chassis may be supported in the housing for strengthening the housing, affixing latch means to one of the components and providing cooperating latch means on another of the components for biasing the components together in operative form.

62. A toaster comprising component parts including a chassis component having at least one oven and having heating means on opposite sides of the oven, a housing component adapted to receive the chassis therein and having an opening cooperable with the oven in the chassis, one of the components having manually releasable fastening means fixed thereto for operatively coupling the chassis to the housing whereby upon manual release of the fastening means the chassis may be removed from the housing without the use of tools.

References Cited

UNITED STATES PATENTS

| | | | |
|---|---|---|---|
| 809,529 | 1/1906 | Richardson | 339—105 XR |
| 1,617,558 | 2/1927 | Wolcott | 99—378 XR |
| 2,131,278 | 9/1938 | Gough | 99—385 |
| 2,261,238 | 11/1941 | Eaton | 339—105 XR |
| 2,404,915 | 7/1946 | McCullough | 99—400 XR |
| 2,542,231 | 2/1951 | Campbell | 99—329 XR |
| 2,655,095 | 10/1953 | McCullough | 99—400 |
| 2,689,666 | 9/1954 | Olson et al. | |
| 2,838,989 | 6/1958 | Clark et al. | 99—401 |
| 3,169,469 | 2/1965 | Parr | 99—385 XR |
| 3,279,352 | 10/1966 | Jepson et al. | 99—385 |
| 3,334,576 | 8/1967 | Bufkin et al. | 99—385 |

BILLY J. WILHITE, Primary Examiner

U.S. Cl. X.R.

29—401, 428; 99—400; 220—4